US012309664B2

(12) United States Patent
Micallef et al.

(10) Patent No.: US 12,309,664 B2
(45) Date of Patent: May 20, 2025

(54) SYSTEMS AND METHODS FOR POSITIONING ASSETS OVER A WIRELESS NETWORK

(71) Applicant: RedLore Canada Inc., Dunrobin (CA)

(72) Inventors: David Micallef, Rabat (MT); Niek Van Dierdonck, Dunrobin (CA)

(73) Assignee: RedLore Canada Inc., Dunrobin (CA)

( * ) Notice: Subject to any disclaimer, the term of this patent is extended or adjusted under 35 U.S.C. 154(b) by 679 days.

(21) Appl. No.: 17/560,862

(22) Filed: Dec. 23, 2021

(65) Prior Publication Data
US 2023/0209309 A1   Jun. 29, 2023

(51) Int. Cl.
*H04W 4/029* (2018.01)
*G01S 5/02* (2010.01)
*G01S 5/14* (2006.01)
*H04W 4/02* (2018.01)

(52) U.S. Cl.
CPC .......... *H04W 4/029* (2018.02); *G01S 5/0268* (2013.01); *G01S 5/14* (2013.01); *H04W 4/023* (2013.01)

(58) Field of Classification Search
CPC ....... H04W 4/029; H04W 4/023; H04W 4/35; G01S 5/0268; G01S 5/14; G01S 5/0205; G01S 5/0269; G01S 5/0045; G01S 5/0215
See application file for complete search history.

(56) References Cited

U.S. PATENT DOCUMENTS

| 7,768,394 B2 | 8/2010 | Amidi | |
| 2019/0380311 A1* | 12/2019 | Crouthamel | A01K 11/004 |
| 2022/0343342 A1* | 10/2022 | Kovacs | G01C 21/206 |

FOREIGN PATENT DOCUMENTS

| CN | 101435867 A | 5/2009 | |
| CN | 101435876 B | 7/2011 | |
| WO | WO-9635196 A1 * | 11/1996 | G07C 3/00 |

* cited by examiner

*Primary Examiner* — James J Yang
(74) *Attorney, Agent, or Firm* — Stratford Group Ltd.

(57) ABSTRACT

Systems and methods for positioning assets over a wireless network are provided. In one embodiment, the method comprises: building, at a topology entity communicatively coupled to a wireless network a low-resolution spatial topology of said wireless network; selecting a list of a plurality of participating anchors for participating in a plurality of ranging events with a participating tag positionally associated with a designated asset; sending to the participating tag and to each of the participating anchors, an indication that a plurality of ranging events is to be executed therebetween; and executing, between the participating tag and each of the participating anchors, a ranging event of said plurality of ranging events; and computing, at a positioning engine a position of the participating tag and the designated asset based on a ranging information generated by the plurality of ranging events.

18 Claims, 6 Drawing Sheets

SYSTEMS AND METHODS FOR POSITIONING ASSETS OVER A WIRELESS NETWORK

CROSS-REFERENCE TO RELATED APPLICATIONS

This application claims priority to U.S. patent application Ser. No. 17/560,334, filed Dec. 23, 2021, which is incorporated herein by reference in its entirety.

FIELD

The present disclosure relates to wireless positioning and ranging technologies, and more particularly to systems and methods for positioning assets over a wireless network.

BACKGROUND

Automated position determination or positioning is the process of determining the position of a physical object such as box or a person in an automated manner, i.e., without human intervention to aid the process. In the disclosure below, we are excluding global positioning systems, such as those powered by satellite systems. Instead, positioning as used herein is intended to mean positioning objects in a localized space. Such a localized space can be as small as a room, or can extend over very large distances, but not the entire earth.

Positioning has many applications, for example:
Asset tracking—where a company needs to know the position of its Assets within a building or on a yard.
Process Automation—where the position is used as an indication of the state of a particular Asset (e.g., knowing that an Asset has reached the packaging department means its currently being packed)
Virtual Fencing or GeoFencing—where a 'virtual fence' or an area (often depicted as a polygon on a map) is setup in a software environment; if an Asset enters or exists the fence an alarm is raised.
People tracking—used to determine the current position of a person within a space, for reasons of safety, operational efficiency, dispatching, etc.

A common notion connected to positioning and relevant for the invention is ranging. Ranging is the process of determining or estimating the distance between two objects or devices. Ranging is typically performed between a device located at a fixed and known location and a device whose location needs to be determined.

Definitions

In what follows we shall use the term Asset to mean any physical object, such as a machine, a piece of raw material, a person, etc.

A Tag is a device attached to the asset and that provides the function of position determination for the asset. A system determines the location of the tag and from there infers the location of the asset as being identical to that of the tag. Tags are normally battery powered, so they have a limited life expectancy, the lifetime of the battery. Hence low-power operation is an important optimization metric.

In the following text, an Anchor specifies some form of device that is normally installed at a fixed known location. The anchor provides a reference location that helps to determine the asset's location by performing ranging between the asset and the anchor.

There are a number of technologies currently in use that provide positioning. The list below outlines the major techniques known in the art. Other specific solutions can be found but are mostly variants from the list below.

1. Proximity—Proximity-based solutions determine a tag to be 'close' to an Anchor if the 2 devices are within wireless range of one another. When such a wireless connection is established, it is said that the tag is in the proximity of the Anchor. In these kinds of solutions, tags normally have a limited wireless range, so the proximity limits the tag's location to a sufficiently local area, although what 'local' means may vary from application to application. In applications using Proximity-based positioning anchors are typically installed at areas of interest, or Points-of-Interest. So, the tag being or not being within wireless range of the anchor serves as a classifier to determine whether or not the tag is within or outside of the area of interest. In the above proximity is assumed identical to being within wireless range. A slightly more advanced version can require the received signal strength to be at least at a certain level to establish proximity. Similarly, the Time-of-Flight of a wireless signal between 2 objects can also be taken into consideration to determine Proximity by requiring that time to be no longer than a predefined time. An advantage of proximity is that the tags utilized can be extremely cheap and small since in their most basic form they only need to transmit short unidirectional messages at predetermined time intervals. These messages then need to be picked up (received) by the anchor. A typical use case for this technology is in retail: a person's smartphone acts as a tag, and when it gets close to a product, an anchor affixed to that product senses that the smartphone is near and pushes an ad or commercial offer to the smartphone related to the particular product.

2. Lateration and Angulation—Lateration is the process of determining the position of an asset, to which the tag is attached, by taking into account the distance to multiple anchors. This distance is usually the result of a prior ranging activity. If three anchors are used, then it's called Trilateration and if more than three anchors are used then it's called multilateration. Lateration works in the following way: assume the distance from a tag to three anchors is known and all three anchors and the tag reside in the same plane (e.g., on the same floor), then in theory the location of the tag can be determined based on the known locations of the anchors. This can be pictured by drawing a circle around each anchor with the distance to the tag as the radius. The circles will intersect at a single point, the location of the tag. This is called trilateration. In reality measurement inaccuracies will cause the circles not to perfectly intersect, leading to a certain positioning area rather than a single point. To compensate for measurement inaccuracies, more than three anchors can be used to improve the accuracy, in which case the method is called multilateration. Derivatives of the above principles are used when the anchors and tags do not reside in the same plane. One application of Lateration is determining a mobile phone's location by taking into account the distance between the phone and the cell towers the phone is connected to. Lateration is used as a popular positioning technique when using WIFI, Bluetooth (BLE) or Ultra-Wide-Band (UWB) as the underlying ranging wireless technology. So, in this case Lateration augments these technologies to become positioning technologies. The above mechanism describes how at least three anchors are required to determine the position of a tag on a plane. Recent innovations relax this requirement by also estimating the angle of arrival of a wireless message, such that, in theory, only 1 anchor is required. These methods are called angulation, or triangulation when three anchors are involved or multi-langulation when two or more than three Anchors are involved. With each of the lateration and angulation methods above ranging needs to happen between the anchor(s) and the tag. This is carried out using one or a combination of the following methods:

Signal Strength-based ranging (sometimes called RSSI-based ranging) measures the attenuation of the signal strength (the weakening of the wireless field) when it travels from the Anchor to the Tag or vice-versa. The attenuation is calculated by comparing the received signal strength to the transmitted signal strength. This attenuation has a direct relationship to the actual distance. Under ideal conditions, the further away the Tag is from an Anchor, the lower the signal strength is of the signal. For example, if the signal was transmitted with a strength 100 and received with a strength 10, then the attenuation is 90, or 90%, or a factor of 1/10. This attenuation is then translated to a distance, e.g., 15 m by using a transformation function derived from physics. This kind of technology is used by the following wireless positioning technologies: Bluetooth/BLE (Bluetooth Low Energy), WIFI and cellular. The disadvantage of this method is that signal attenuation varies due to a number of conditions that are not related to the distance between the Tag and the Anchor: The environment, the placement of the antennas, the presence of objects in the line-of-sight between Anchor and Tag, and many other factors influence the attenuation and thus the accuracy of this method is low. It is typical for systems using this method to achieve only +/−5 m accuracy. The advantage of this method is that it is technologically relatively easy to implement by not requiring complex time synchronizations and time accurate hardware as required by the other methods. Hence both the Tags and the Anchors are typically cheaper than when using other distance estimation techniques.

Time-of-Flight (ToF) based systems calculate the distance between the transmitter and the receiver (anchor to tag or tag to anchor) by calculating the time it takes for a signal to be transmitted from one entity to another entity. Radio waves travel at the speed of light (roughly $3 \times 10^8$ m/s with air as the medium between transmitter and receiver). Thus, if the time it takes for a signal to travel is known, then the distance travelled can be estimated. These kinds of systems are very accurate and achieve accuracies of +/−0.1 m with no objects in line of sight, i.e., 1 to 2 orders of magnitude better than with the signal-strength based approach. If there are objects, such as liquids, obstructing the line-of-sight between transmitter and receiver, then the speed of light will vary, giving rise to a lower accuracy compared to an unobstructed line-of-sight, but still much more accurate than the signal-strength based approach, typically by an order of magnitude. ToF methods are further split into two methods:

a. TDoA (Time Difference of Arrival)—TDoA measures the time difference between ranging messages between a tag and different anchors, i.e., the difference in time it takes for a signal sent by the tag to arrive at different anchors. These time differences do not translate directly into Anchor-Tag distances. Instead, they lead to differences in distances between the Tag and the different Anchors. When sufficient distance-differences are available, then the actual Anchor-to-Tag distances can be calculated by solving a set of equations. This implies that an anchor, on its own, is unable to estimate the distance to/from a tag. It requires at least one or a few more anchors to be able to determine a difference in distance. A popular way to make TDoA work, is to synchronize the anchors to one common time at sub-nanosecond accuracies. That way all the Anchors have to do is to report in the arrival times of Tag messages, which can then be directly compared. The advantage of this method is that it allows for an implementation with very cheap tags: A tag emits a message, which can be done with very simple and cheap hardware and at very low power consumption and thus with a very good battery life. In this case the anchors are receiving the messages from the tag. Due to the fact that the anchors are time-synchronized they are able to determine the time difference of the arrival of the tag's message. The disadvantage of this method is that they require a complex network of wired anchors with special and expensive hardware to keep them time-synchronized.

b. TWR (Two-Way Ranging)—The distance between an anchor and a tag is estimated using time of flight from the Tag to the Anchor and back, or the other way around from Anchor to Tag and back. A message has to be sent back and forth between the tag and the anchor to perform ranging. Here the anchor will determine the distance to the tag (or the way around) directly, i.e., without relying on a time synchronized network of anchors. This method has the advantage of a cheap and low-cost anchor network (including a cheaper installation) as they don't need to be time-synchronized. The tags however consume more battery power than in TDoA because there is 2-way communication. In today's TWR applications the anchors are typically in a constant listening mode for ranging messages from tags. As a result, these anchors consume considerable power and must be mains powered rather than battery powered.

There are a number of issues or problems with state of the art as discussed above. Notably, these include:

Wired anchors are costly to buy and costly to install. The above-mentioned positioning technologies, prohibit wire-free operation, as they require at least power wiring and sometimes also data wiring to operate. Pulling wires in a building is costly, especially so in retrofitted installations and even more so when the facility is in use, such as in hospital full of patients. Moreover, wires also limit the options for the placement of Anchors to places where wires can be passed.

Signal-strength ranging is not accurate. As discussed above, methods based on signal strength to do ranging have a limited accuracy, typically in the order of 5 m. This limits their practical applicability. As an example, the movement of an Asset from a loading dock into a trailer or from a trailer onto a loading dock is an important logistical process event. The system needs to accurately make a distinction between an Asset standing at the back of the truck, i.e., adjacent to the loading dock, or the Asset standing on the loading dock but very close to the truck. This and many other use cases are out-of-reach of signal-strength ranging.

A wireless positioning network with battery-powered anchors is not able to track mobile assets. When anchors need to be battery powered, e.g., to avoid the need for cabling, then they will automatically need to be duty-cycled, i.e., between a sleep and awake mode. This stems from the fact that in the awake state requires significant power, which would deplete a reasonably sized battery faster than possible to integrate in an Anchor device from a practical and financial perspective. This presents a problem when mobile Tags need to be positioned, i.e., tags that are travelling through the network. A positioning activity requires ranging to a multitude of Anchors and assumes the ranging occurs with the Tag being at the same place for all rangings. For a mobile Tag the only way the rangings can occur with the tag at the same place, is when all rangings occur at the same time. If those rangings would not occur at the same time, then different rangings would see the tag at different locations, breaking the positioning algorithms. One may think that an exception to the above is presented by time-synchronized duty-cycled wireless networks, such as Wirepas Massive. In these wireless networks there is a form of time-synchronization between devices. However, the time-synchronization of such networks in the State-of-the-Art is local, i.e., between devices in a localized area, but not throughout the network. With a mobile network, a tag per definition does not stay in a localized area. Once outside of its original are, where it could have been time-synchronized to the local Anchors, it will need to regain time-synchronization in the new local area, which will require a lot of power from the Tag. This is not possible as a mobile Tag needs to be battery-powered to be able wander through the network effectively. Hence time-synchronized duty-cycled wireless networks with battery-powered anchors also do not allow positioning of mobile assets.

Wired Anchors in Time-of-Flight methods are unpractical to install in moving objects such as vehicles, trolleys, etc. Some use cases require Assets to be tracked in 'movable properties' such as trucks and trailers, which carry these Assets. Take the previous example where the movement of an Asset from a loading dock into a trailer or from a trailer needs to be detected. Given the Anchor's need to be connected to a wired network in all Time-of-Flight methods, it is impossible from a practical and use case perspective to install an Anchor on a truck. Hence, Assets can only be tracked when they are on site. The use case described above with the Asset standing on the loading bay or in the truck/trailer is thus also out of scope for Time-of-Flight methods as described in the State-of-the-Art. To aggravate the situation, specifically in TDoA solutions, at least three anchors are required to estimate a distance. For sufficient accuracy, the distance between the Anchors needs to be sufficiently large, making it further impractical to install in a vehicle.

A low density of anchors increases the chances of having no line of sight and hence a lower ranging accuracy or failure to range at all. No-Line-of-Sight (NLOS) is a term used to describe a situation where the Tag does not have a direct line of sight to the Anchor because there are objects between the Anchor and the Tag. This condition impacts the accuracy of the distance determination with all the technologies listed above. As a result, there may be 'blind spots' in the positioning area, where accuracy is negatively impact or positioning actually becomes impossible. In case of NLOS adding additional Anchors to "circumvent" the blind spots can help regain accuracy. Installing such additional wired Anchors is, however, often hard to achieve because the need for wiring imposes extra costs or may be impossible, especially if the wire needs to traverse zone where wiring needs to run in special conduits or is not allowed at all. In practice we see that often the density of Anchors is kept low, for example for reasons of cost, and the NLOS issue has a detrimental impact on accuracy. This problem can be significantly reduced if the Anchors could be battery powered (which is one of the key features of this invention, see below), because then they can be installed at very low cost (no wires to be installed). Battery-powered Anchors can be installed in virtually any place, optimized to reduce the occurrence a NLOS, unlike in most cases the wired Anchors, where the installation location is constrained by the possibility to have a wire passed to the intended location.

Massive tag densities severely impact the positioning update rate to avoid message collisions. Current technologies, including TDoA and Signal Strength-based solutions, do not utilize any time synchronization between Tags. This means Tags transmit messages based on their own decision-making mechanisms, in most cases based on a fixed time interval or a sensor-driven event, such as motion. When two or more Tag transmissions overlap, at least one of them and usually both of them become garbled and do not lead to a successful ranging. This is called a message collision. In a network with a small density of Tags the chances of having 2 or more tags transmitting at the same time and thus colliding, is low. In larger densities the collision problem becomes a problem as the chances of collision increases. Above a certain density of tags, a high fraction of messages collides, impairing a successful ranging and positioning deployment. Reducing the positioning update rate may then be performed to reduce the collision rate, but such a lower update rate is often incompatible with the use case requirements. To aggravate the problem, it is important to understand that many current technologies utilize the same wireless technology for both distance estimation and for data communication, thereby increasing the number of messages transmitted and thus the chance of collision.

Limitations of the state-of-the-art for point-of-interest detection. In TDoA systems, at least three Anchors are required to be able to calculate a Tag's position, as explained above. This means that for every point-of-interest, three or more Anchors are required, which is an additional cost. To aggravate the situation, for reasonable accuracy with TDoA, these Anchors need to be spaced sufficiently apart. On the other hand, signal strength-based solutions for Proximity-based Point-of-Interest detection are not accurate enough because of their inability to reach a high ranging accuracy Thus, the only real solution in the market that can provide, in an efficient manner, a distance estimation, is TWR, which has other disadvantages as discussed elsewhere.

Radio technologies implementing Time-of-Flight (TOF) are not suited for battery operation. In the State-of-the-Art positioning is usually done using wired Anchors. These Anchors are usually connected to a 'backhaul' network that allows data communication between the Anchor and one or more central device(s), which can be a network coordinator, a gateway, a server, etc. The backhaul network is typically Ethernet, WIFI or some other high bandwidth network with a low communication latency. The backhaul network is typically an expensive investment and costly to install. If one wants to get rid of the disadvantage of wired backhaul network and still keep within the capabilities of radio technologies implementing TOF for ranging, then with the State-of-the-Art one needs to use a battery powered system. As explained above a ToF TDoA system cannot be battery powered, so the only alternative is to use a ToF TWR system. As we want to leave out a backhaul network, the ToF TWR wireless capability must not only be used for ranging but also for backhauling the received data from the Tags back to the central device. This imposes a set of difficult requirements:

1. The ranging must not overlap in time with the backhaul data communication to avoid collisions. This thus amounts to the need for synchronization between Anchor and Tag.
2. The Anchors need to establish a mechanism to communicate the data back to the central device using the TWR's capabilities. This is normally done by establishing some form of network topology across the Anchor network thus implying either anchor to anchor synchronization or else another elaborate mechanism to do away or at least minimize message collisions.

Requirements 1 and 2 above make the system very complex and impractical, especially in high density scenarios. Efficiency is another important factor. The best radio technologies that implement TOF are at least 10 times less power-efficient when compared to other low power radio systems when used for data communication. As an example, from the State-of-the-Art, the Quorvo DW1000 UWB chip has an average receive power consumption (=the current consumption when the chip is listening for incoming signals) of around 100 mA compared to 6.5 mA for a Nordic nrf52832 BLE Radio.

This is why current commercial systems utilizing TOF in TWR-mode mostly use it for peer-to-peer distance estimation in a local context (e.g., to estimate the distance between a smartphone, acting as an Anchor, and a Tag).

From the issues above, it is clear that Signal Strength-based methods have their limitations, especially limited accuracy. ToF-based methods have the advantage of accuracy but suffer from network complexities that make it difficult and costly to install in buildings and practically impossible to use in mobile environments because of the required wiring. Moreover, a fully battery powered network relying on TOF radio technologies, is not practically possible with State-of-the-Art technologies.

BRIEF SUMMARY

The following presents a simplified summary of the general inventive concept(s) described herein to provide a basic understanding of some aspects of the disclosure. This summary is not an extensive overview of the disclosure. It is not intended to restrict key or critical elements of the embodiments of the disclosure or to delineate their scope beyond that which is explicitly or implicitly described by the following description and claims.

A need exists for systems and methods for managing ranging events over a network, or at least, provide a useful alternative thereto. Some aspects of disclosure provide embodiments of such systems and methods.

In accordance with one aspect, there is presented a computer-implemented method for positioning a designated asset from a plurality of assets, the method comprising: building, at a topology entity communicatively coupled to a wireless network, the wireless network comprising a plurality of tags positionally associated with the plurality of assets and a plurality of anchors having a fixed physical location, a low-resolution spatial topology of said wireless network; selecting, at the topology entity and at least in part using said low-resolution spatial topology, a list of a plurality of participating anchors for participating in a plurality of ranging events with a participating tag positionally associated with the designated asset; sending, from the topology entity, to the participating tag and to each of the participating anchors, an indication that a plurality of ranging events is to be executed therebetween; and executing, between the participating tag and each of the participating anchors, a ranging event of said plurality of ranging events; and computing, at a positioning engine communicatively coupled to the wireless network, a position of the participating tag and the designated asset based on a ranging information generated by the plurality of ranging events.

In one embodiment, said building is done by: encoding, at the topology entity, the fixed physical location of each of said plurality of anchors to the low-accuracy spatial topology; identifying, at each of said plurality of tags and at each of said plurality of anchors, a set of in-range tags and anchors from remaining plurality of tags and plurality of anchors; reporting, from each of said plurality of tags and each of said plurality of anchors, to the topology entity, the set of in-range tags and anchors; and inferring, at the topology entity, from said fixed physical location of said plurality of anchors and from the set of in-range tags and anchors, the low-accuracy topology map of the location of the plurality of tags and the plurality of anchors.

In one embodiment, said selecting is done by, at the topology entity: determining, using the low-accuracy topology map, the plurality of participating anchors as being one or more anchors from the plurality of anchors which are the closest to the participating tag.

In one embodiment, said determining further includes: recording, at each of said plurality of anchors and at each of said plurality of tags, a signal strength measurement corresponding to each device in said set of in-range tags and anchors; and wherein said inferring is also based on, at least in part, said signal strength measurement.

In one embodiment, the topology entity is implemented on one of said plurality of anchors.

In one embodiment, said topology entity comprises in a memory thereof a map of physical obstacles and their physical position, and wherein said determining is based, at least in part, on said the physical position of the physical obstacles.

In one embodiment, the list of the plurality of participating anchors is an ordered list characterizing the order upon which the plurality of ranging events between participating anchor and each of the participating tags is to be executed, the order being based on an accuracy score of said participating tag, computed by the topology entity, a higher accuracy score being associated with a higher priority; wherein the accuracy score is based, at least in part, on a number of links between the participating tag and each of the plurality of participating anchors, a lower number of links being associated with a higher accuracy score; and wherein each ranging event from the plurality of ranging events is initiated in accordance with that ordered list.

In one embodiment. the method further comprises the steps of, between said building and said selecting: detecting, at each tag in the plurality of tags, via a motion sensor, a motion of said tag; identifying, at each tag, at regular time intervals, any in-range tags and anchors from said plurality of tags and said plurality of anchors; sending, from the tag, to the topology entity a list of said identified in-range tags and anchors and an indication that the tag is detecting motion; receiving, at the topology entity, the list of said identified in-range tags and anchors for said tag and the indication that the tag is detecting motion; and updating the low-accuracy spatial topology based on said list of identified in-range tags and anchors.

In accordance with another aspect, there is presented a system for positioning a designated asset in a plurality of assets over a wireless network, the system comprising: a plurality of tags communicatively coupled to the wireless network, each tag of said plurality of tags being correspondingly positionally associated with the plurality of assets; a plurality of anchors communicatively coupled to the wireless network and each having a fixed physical location; a topology entity, the scheduling entity comprising: a memory; a network interface communicatively coupled to said wireless network; and a processor communicatively coupled to said memory and said network interface; and wherein said scheduling entity is operable to: build a low-resolution spatial topology of said wireless network; select, at least in part using said low-resolution spatial topology, a list of a plurality of participating anchors for participating in a plurality of ranging events with a participating tag positionally associated with the designated asset; send to the participating tag and to each of the participating anchors, an indication that a plurality of ranging events is to be executed therebetween; and wherein said participating tag and each of the participating anchors are configured to: execute, at the ranging time, between the participating tag and each participating anchor, the ranging event to produce a corresponding ranging information; and the system further comprising a positioning engine communicatively coupled to the network, said positioning engine configured to calculate from each corresponding ranging information, a position of said participating tag and said designated asset.

In one embodiment, the topology entity is configured to build the low-accuracy spatial topology by: encoding the fixed physical location of each of said plurality of anchors to the low-accuracy spatial topology; wherein each of said plurality of tags and at each of said plurality of anchors are further configured to identify and report to the topology entity a set of in-range tags and anchors from remaining plurality of tags and plurality of anchors; and the topology entity being further configured to infer, from said fixed physical location of said plurality of anchors and from the set of in-range tags and anchors, the low-accuracy topology map of the location of the plurality of tags and the plurality of anchors.

In one embodiment, said selecting is done by, at the topology entity: determining, using the low-accuracy topology map, the plurality of participating anchors as being one or more anchors from the plurality of anchors which are the closest to the participating tag.

In one embodiment, said topology entity comprises in said memory thereof a map of physical obstacles and their physical position, and wherein said determining is based, at least in part, on said the physical position of the physical obstacles.

In one embodiment, the list of the participating anchors is an ordered list characterizing the order upon which the plurality of ranging events between participating anchor and each of the participating tags is to be executed, the order being based on an accuracy score of said participating tag, computed by the topology entity, a higher accuracy score being associated with a higher priority; wherein the accuracy score is based, at least in part, on a number of links between the participating tag and each of the plurality of participating anchors, a lower number of links being associated with a higher accuracy score; and wherein each ranging event from the plurality of ranging events is initiated in accordance with that ordered list.

In one embodiment, at least one device of said plurality of tags and said plurality of anchors is changeably configurable to act as either a tag or as an anchor upon receiving a trigger.

In one embodiment, the trigger is received by the at least one device via the wireless network.

In accordance with another aspect, there is presented a non-transitory computer-readable storage medium, the computer-readable storage medium including instructions that when executed by a processor communicatively coupled to a wireless network comprising a plurality of anchors, each anchor having corresponding fixed physical location, and a plurality of tags, each tag being positionally associated with a corresponding asset, causes the processor to: build a low-resolution spatial topology of said wireless network; select, at least in part using said low-resolution spatial topology, a plurality of participating anchors for participating in a plurality of ranging events with a participating tag positionally associated with the designated asset; send to the participating tag and to each of the participating anchors, an indication that a plurality of ranging events is to be executed therebetween.

In one embodiment, said building is done by: encoding the fixed physical location of each of said plurality of anchors to the low-accuracy spatial topology; receiving, from each of said plurality of tags and each of said plurality of anchors, a set of in-range tags and anchors; inferring from said fixed physical location of said plurality of anchors and from the set of in-range tags and anchors, the low-accuracy topology map of the location of the plurality of tags and the plurality of anchors.

In one embodiment, said selecting is done by, at the topology entity: determining, using the low-accuracy topology map, the plurality of participating anchors as being one or more anchors from the plurality of anchors which are the closest to the participating tag.

In one embodiment, said determining further includes: receiving from each of said plurality of anchors and from each of said plurality of tags, a signal strength measurement corresponding to each device of said set of in-range tags and anchors; wherein said inferring is also based on, at least in part, said signal strength measurement.

In one embodiment, said determining is based, at least in part, on a known physical position of a plurality of physical obstacles.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
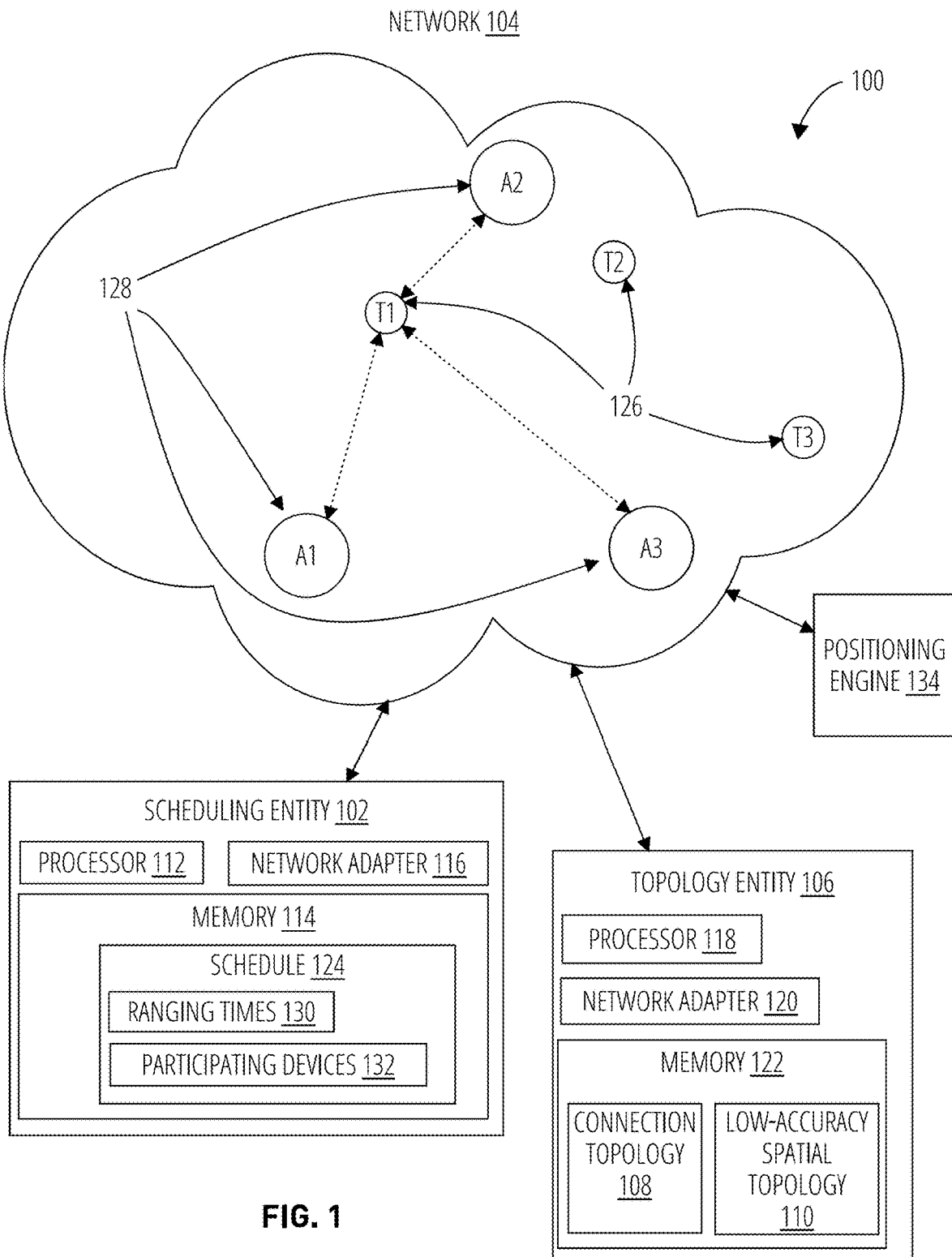
FIG. 1 illustrates a schematic diagram of a positioning system for positioning a plurality of tags over a wireless network via a plurality of anchors, in accordance with one embodiment.

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

In accordance with different embodiments, systems and methods for positioning assets over a wireless network are discussed below. These systems and methods provide the ability position assets by efficiently selecting and scheduling a plurality of ranging events between a plurality of participating tags positionally associated with the assets and a plurality of participating anchors which have a fixed known location. In some embodiments, the position systems and methods discussed below utilize a scheduling entity, described below in accordance with different embodiments, that allows to reduce processing time and power consumption for each ranging event while allowing for denser networks by reducing or eliminating the occurrence of ranging message collisions. Additionally, or alternatively, the systems and methods discussed below may rely on a topology entity, also described below in accordance with different embodiments, that offers the ability to efficiently build a low-accuracy spatial topology of the wireless network that allows to efficiently choose or select the participating tags and anchors, including the order in which these are to be ranged. In addition, at least some of the tags and anchors discussed below are implemented on wireless devices which are changeably configured to assume the role of a tag and/or an anchor.

Scheduling Entity

FIG. 1 illustrates schematically a positioning system 100, the system including a wireless network 104 comprising a plurality of wireless network devices, some being configured to act as tags 126 positionally associated with the assets and the others being configured to assume the role of anchors 128 having a fixed known location. In the system 100 of FIG. 1, as an illustrative example only, the anchors 128 are shown to include three anchors: A1, A2 and A3, while the tags 126 are shown to include three tags: T1, T2 and T3. However, the skilled person in the art will appreciate that the network 104 may generally comprise any number of tags 126 and anchors 128, without limitation. The system 100 is generally operable to infer the position of each asset by determining the position of an associated participating tag via a plurality of ranging events between the participating tag and a number of participating anchors chosen from the anchors 128. In some embodiments, the tags 126 and anchors 128 may be dedicated wireless devices, while in other embodiments, they may be implemented via software and/or hardware on wireless devices that may be changeably configured to act as or assume the role of a tag 126, an anchor 128, or both.

As shown in FIG. 1, the system 100 may comprise, in some embodiments, a scheduling entity 102 communicatively coupled to the network 104, either by being implemented on a device that is part of the network 104 or by being operable to exchange messages with the tags 126 and anchors 128 of the network 104 in any sort of way. In some embodiments, the scheduling entity 102 may be implemented, in software and/or in hardware, on a device which comprises at least one processor 112, a memory 114 and a network adapter 116 so as to be directly or indirectly communicatively coupled to the network 104 and each of the tags 126 and the anchors 128.

In some embodiments, the scheduling entity 102 is configured to determine a schedule 124 of times when the ranging should occur (i.e., ranging times 130) for each ranging event between two or more participating devices 132, meaning which tags 126 in the network 104 need to be positioned (the participating tag) and which anchors 128 will participate in the ranging events of every such tag 126 (the participating anchors). As an example, in FIG. 1, assume tag T1 will be ranging with anchors A1, A2 and A3 (illustrated via the dotted lines). In some embodiments, these ranging times 130 can for example be determined as a delay from the time the scheduling entity 102 initiated the ranging cycle to start. For example, assume the scheduling entity 102 initiates the ranging cycle at time=$T_0$ and indicates the ranging should take place at $T_{30}$, i.e., 30 seconds after $T_0$.

Figure 2:
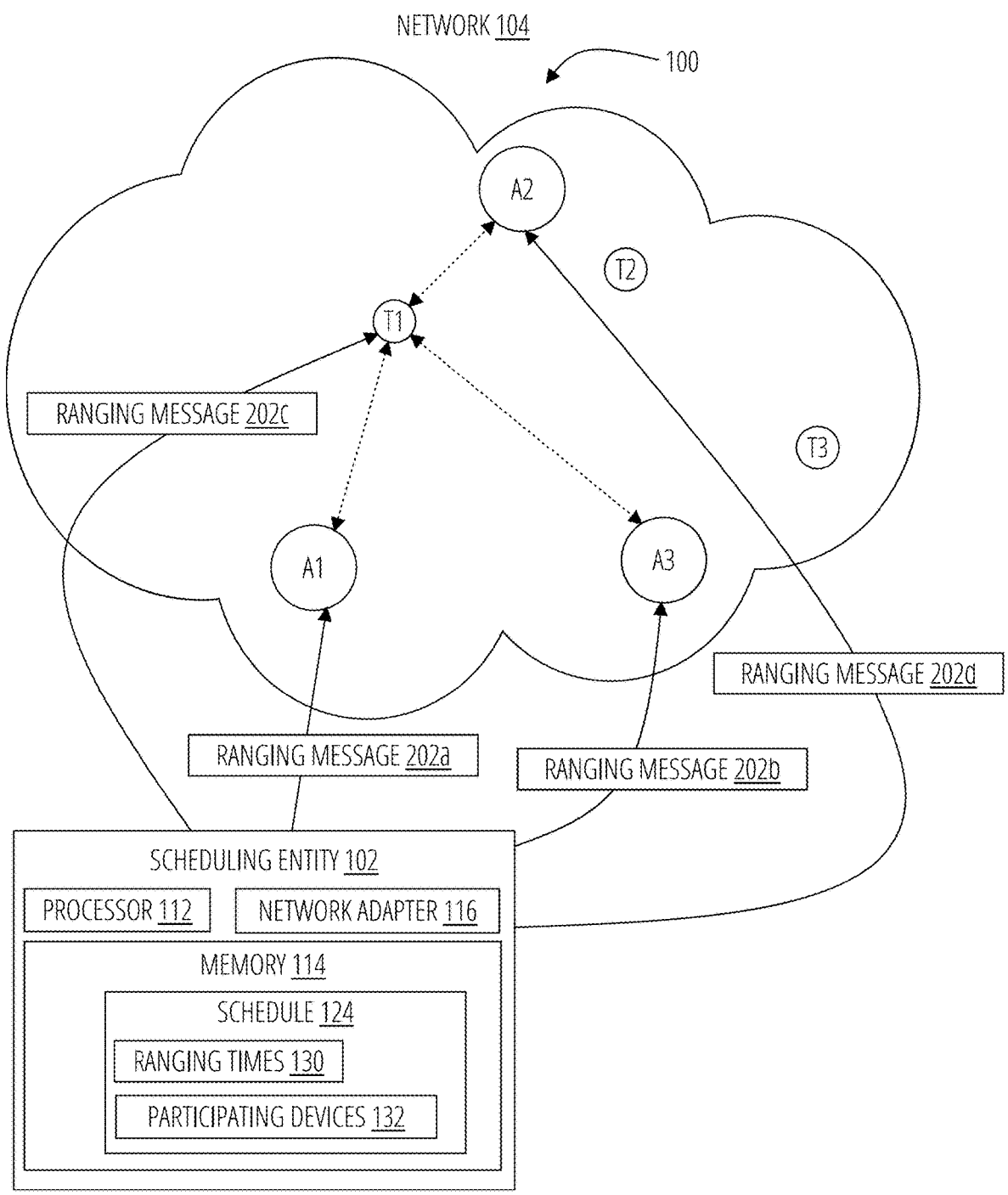
FIG. 2 illustrates a schematic diagram of a positioning system for positioning a plurality of tags over a wireless network via a plurality of anchors, in accordance with one embodiment.

In some embodiments, as illustrated in FIG. 2, the scheduling entity 102 is operable to send a plurality of ranging messages 202 to each of the participating devices 132 to the ranging event (e.g., selected from the plurality of tags 126 and anchors 128). In this example, ranging message 202a, 202d, 202b and 202c are sent to A1, A2, A3 and T1, respectively. In some embodiments, each of the messages 202 may be delivered on a direct link between the scheduling entity 102 and the targeted device, as is the case when the scheduling entity 102 is sitting at the top of a star network topology. Or, in some embodiments, the network 104 may be any other form of network, where multiple links between devices must be traversed to deliver the message to the ranging device, such as for example in a mesh network or the like. Thus, the skilled person in the art will appreciate that the schematic diagrams of FIGS. 1 and 2 are not meant to illustrate any specific network configuration and/or topology, but only to illustrate generically the role associated with the scheduling entity 102, tags 126 and anchors 128.

In some embodiments, the scheduling entity 102 may not message all participating devices 132 simultaneously. In such cases, the delay encoded in each of the messages 202 from the scheduling entity 102 to a given participating tag or participating anchor from the participating devices 132 further takes into account the delays between the different messages 202 from the scheduling entity 102 so as to correct the delay such that the effective ranging time falls at the same time for every participating device.

In order for the ranging devices/participants to know when to initiate a ranging event/exercise, they need to take into account the travel time it took the message from the scheduling entity 102 to arrive. For example, in FIG. 2:

A1 receives the ranging message 202a with a travel time of 7 seconds. A1 schedules the ranging event for $t_0+30$ s−7 s=23 s. In 23 seconds, A1 will start the ranging event to Tag T1.

A2 receives the ranging message 202b with a travel time of 14 seconds. A2 schedules the ranging event for 16 seconds.

A3 receives the ranging message 202c with a travel time of 20 seconds. A3 schedules the ranging event for 10 seconds.

T1 receives the ranging message 202d with a travel time of 25 seconds and schedules the event for 5 seconds and it is also aware that it will range with Anchors A1, A2 and A3.

In some embodiments, in order to calculate the travel time, the actual time the wireless ranging messages 202 travels through space may be ignored, because this happens at the speed of light and the distances covered in the intended applications are small enough that the wireless delay is negligible for this purpose. Instead, in some embodiments, the relevant travel time is the time to process a ranging message 202, either by the transmitter, i.e., the time between the decision to make a transmission and the time the transmission is actually sent, as well as the time between a receiver receiving the message and the time where the message has been decoded. In a network where there are intermediate receiver/transmitters (aka 'transceivers') between the origin and the final destination, such as a mesh network or the like, multiple transmission and reception processing times need to be added together.

In some embodiments, one way to calculate travel time is for every device which is part of the message chain to add its own processing time to the processing time communicated by the previous device in the chain and to communicate the accumulated travel time to the next device. Hence the final device knows the total travel time it took the message and can calculate the ranging time accordingly.

In other embodiments, another way to calculate travel time is when the network is an entirely or partially time synchronized network (i.e., a network where the Scheduling Entity as well as the devices participating in the ranging (3 Anchors+1 Tag in the example above) are all aware of a common time base). In this case it suffices for the scheduling entity to communicate in its message the time it sent its message and the Anchors and Tags to subtract this time from the reception time to calculate the travel time.

In further embodiments, yet another way to schedule ranging activities is to synchronize the devices in the network first, by sending a synchronization signal to all the participating devices on the network, and subsequently use this synchronization as a point of reference for scheduling the ranging. In order to keep the network devices synchronized, one may have to periodically resend the synchronization signal.

In some embodiments, the scheduling entity 102 is further configured to schedule the ranging events to occur at slightly different ranging times 130, so as to avoid undesirable message collisions to occur. Message collisions are messages overlapping in time and in the same area, which interfere with another rendering the colliding messages unreadable. Typically, when this occurs, the messages need to be resent or repeated until they are all properly received. In some embodiments, the scheduling entity 102 may provide a slightly offset ranging delay to every participating ranging device. In the example of FIG. 1 and assuming $T_{ranging}$ is the time required to run a ranging event between a tag 126 and an anchor 128, then in some embodiments, A1 could be scheduled at $T_{30}$ while A2 could be scheduled at $T_{30}+T_{ranging}$ and A3 could be scheduled at $T_{30}+2*T_{ranging}$. However, larger values for the offset between ranging events may also be used, without limitation.

In the present disclosure, any know method or technique used to implement a ranging event between a tag 126 and an anchor 128 may be used, without limitation. This may include for example proximity methods, lateration and angulation based methods, signal strength based methods and/or ToF-based methods.

Once the ranging events have been executed, the information obtained from each ranging event may be sent to a positioning engine 134 (PE) or similar, which may be implemented, in some embodiments, in hardware and/or software on any device communicatively coupled to the network 104. In some embodiments, the PE 134 is configured to compute the position or physical location of the participating tag based on the ranging information received from the participating tag and participating anchors. In some embodiments, the PE 134 may be implemented on a same device as the scheduling entity 102.

In accordance with different embodiments, the positioning system 100 described above provides a number of advantages over the prior art, including:
1. Fewer message collisions:
    Fewer message retransmissions keep more time available to send useful messages, for ranging purposes or other purposes, thus enabling 2 advantages:
        i. Allowing denser wireless networks, i.e., networks with more participants in the same area.
        ii. Allowing the network more time to perform other useful functions.
    Fewer message retransmissions avoid using power for the retransmissions, hence prolonging the battery life of the device.
1. Allows positioning/ranging a moving tag: since a ranging event only takes a very short time (a few mS)

to carry out and hence a full positioning cycle, including multiple ranging events to multiple anchors, is also accomplished within a very short time, a tag can also range while it is in motion as the motion distance during the positioning can be assumed to be negligible.

2. The system 100 allows to save power by limiting the active time of the devices (e.g., not in sleep mode).

Time-Synchronized Low Power Communication Network

In some embodiments, the network 104 may be a time-synchronized low-power network, such as a time-synchronized wireless communication network or the like. In such a network, devices are all synchronized to a single clock (so have an absolute knowledge of time), or there is time-synchronization between any two devices that can communicate with one another and thus for which full network time-synchronization can be computed. One non-limiting example of such a network technology is the proprietary Wirepas Massive communication protocol. Such a time-synchronized network can route messages through the network across multiple hops with very little power because neighbouring devices can agree on a time to exchange a message and be in a very low-power "sleeping" state otherwise.

In some embodiments, such a low-power time-synchronized wireless network is used for the scheduling of the ranging as discussed above. Thus, the anchors 128 in the ranging/positioning application may be configured to operate in low-power and hence on battery power, for the following reasons:

1. Neither the anchors 128 nor the tag 126 need to be in a power-consuming listening state all the time, waiting for a message from the other device to signal an upcoming ranging event. Instead, thanks to the time-synchronization, the devices can agree on a time to carry out the ranging, without wasting power-consuming time waiting for the other device.

2. Neither the anchors 128 nor the tag 126 need to send repeated Discovery Messages while waiting for the other device to become available. Indeed, the Discovery Messages used in TWR are really used to achieve momentary synchronization between anchor and tag, which is now inherited from the time synchronized wireless network.

In some embodiments, the anchors 128 can be configured to operate in a very low-power mode, enabling battery powering the anchors and avoiding the need for power-wiring. As data communication too is wireless in this case, the anchors 128 may be entirely wire-free. Wire-free anchors have the large benefit that cable infrastructure can be avoided. Such cable infrastructure is expensive to install. In some cases, it is even impossible to achieve (e.g., when the facility is in use and cannot be vacated to allow for infrastructure installation). A good non-limiting example is a hospital or the like.

An additional benefit of using a time-synchronized wireless communication network is that due to the ease of installation of wire-free (battery operated) anchors, one can install more anchors and install anchors at better chosen locations. This effect has the advantage that the ranging and this positioning accuracy will be much higher.

Multicasting Ranging/Positioning

In some embodiments, the ranging messages 202 may be sent from the scheduling entity 102 to the participating tags and participating anchors via individual messages to every participating device 132 (e.g., using a unicast approach). The unicast approach is however not always efficient, because of the large overhead each message brings along in addition to the useful payload information.

Thus, in some embodiments, ranging messages may be sent from the scheduling entity 102 to the participating devices 132 in a Multicast fashion. The ranging messages 202 may be sent using one or more multicast messages instead of individual unicast messages. A multicast message has several destination devices and thus introduces less total overhead. By using multicast messaging, the ranging/positioning activity requires fewer messages in the network, thereby (1) saving power on the devices through which messages are routed and (2) leaving more time for other messages in the network, which in turn allows for (2a) more denser networks and/or (2b) a higher activity level for the existing network devices.

Sub-Group Addressing of Devices for Ranging/Positioning

In some embodiments, the devices participating in a positioning/ranging activity/event may be addressed with a sub-group or a shorter form of their network address over network 104.

Typically, in wireless networks, devices all have a unique address in the network, their network address. To allow for a large number of devices to be part of the same network, a sufficiently large number space needs to be foreseen (e.g., 3 bytes). In reality, manufacturers often choose to give out addresses that are unique beyond any single network, such that the address space is often much larger, such as 4 bytes or more. In the State-of-the-Art every time a device is addressed, the full address of the device is used in the communicated messages.

In a positioning technology, where one or more anchors 128 and a tag 126 participate in the positioning of said tag 126 by executing a ranging action, multiple devices need to be addressed by the scheduling entity 102. As this address uses up a considerable amount of space (e.g., 4 bytes), it takes a non-negligible time to transmit and process the messages by the ranging devices and also by possible devices (if any) acting as routers between the scheduling entity 102 and the participating devices. As a result, the long addresses consume precious airtime and power throughout the network.

In some embodiments, the network address of at least some of the devices may be shortened. In some embodiments, the shortening may be done through any method known in the art, such as, for example, hashing, sub-grouping, using a limited number of digits from the full network address or using digital filters, or performing any mathematical transformation that reduces the information content of the address. In some embodiments, for example, this allows to reduce the size of the address to 1 or 2 bytes.

Because such shortening effectively maps a larger number of addresses onto a smaller pool (e.g., when shortening from a 4-byte addressing space to 2 bytes, the original 4,294,967,296 addresses are mapped onto only 65,536 addresses), it is possible that the addresses of multiple members of the network get mapped onto a same shortened address. As a result, two or more devices with the same shortened address may receive the command to range, where only one was intended. This is called address duplication.

In some embodiments, the system 100 may be configured to reduce or even remove of the occurrence of address duplication. This may be done by, for example in cases where the scheduling entity 102 has knowledge of all the addresses on the network 104, having the scheduling entity 102 deciding how much an address can be shortened without creating address duplication, even having the scheduling entity 102 using the full long address if it cannot be avoided.

Additionally, or alternatively, in some embodiments, the scheduling entity 102 may have knowledge of the Network Topology (as will be discussed further below) and use that knowledge to derive how a message will travel through the network 104, so as to allow for address duplication if, from the topology, the scheduling entity 102 knows that the message will only ever reach the intended device and not the device with the duplicate shortened address.

Topology Entity

Going back to FIG. 1, in some embodiments, the positioning system 100 may comprise, alternatively or additionally to the scheduling entity 102, at least one topology entity 106. Similarly to the scheduling entity 102 discussed above, the topology entity 106 may be implemented, in software and/or in hardware, on a device which is communicatively coupled to the network 104 (as illustrated in FIG. 1), or in other embodiments, on a device which is part of the network 104. As shown in FIG. 1, in some embodiments, the topology entity 106 is implemented on a device comprising at least one processor 118 communicatively linked to a memory 122 and a network adapter 120. In some embodiments, the topology entity 106 may be implemented on the same device as the scheduling entity 102 or one of the anchors 128.

The topology entity 106 is configured to determine, at least in part, which participating devices 132 will participate in a wireless positioning activity or ranging event by using network topology information to determine the devices most suitable to participate in such positioning. In some embodiments, this may be done in cooperation with the scheduling entity 102, or in other embodiments, the topology entity 106 may be integrated into a pre-existing system which has a pre-existing means of scheduling and messaging the ranging events.

Figure 3:
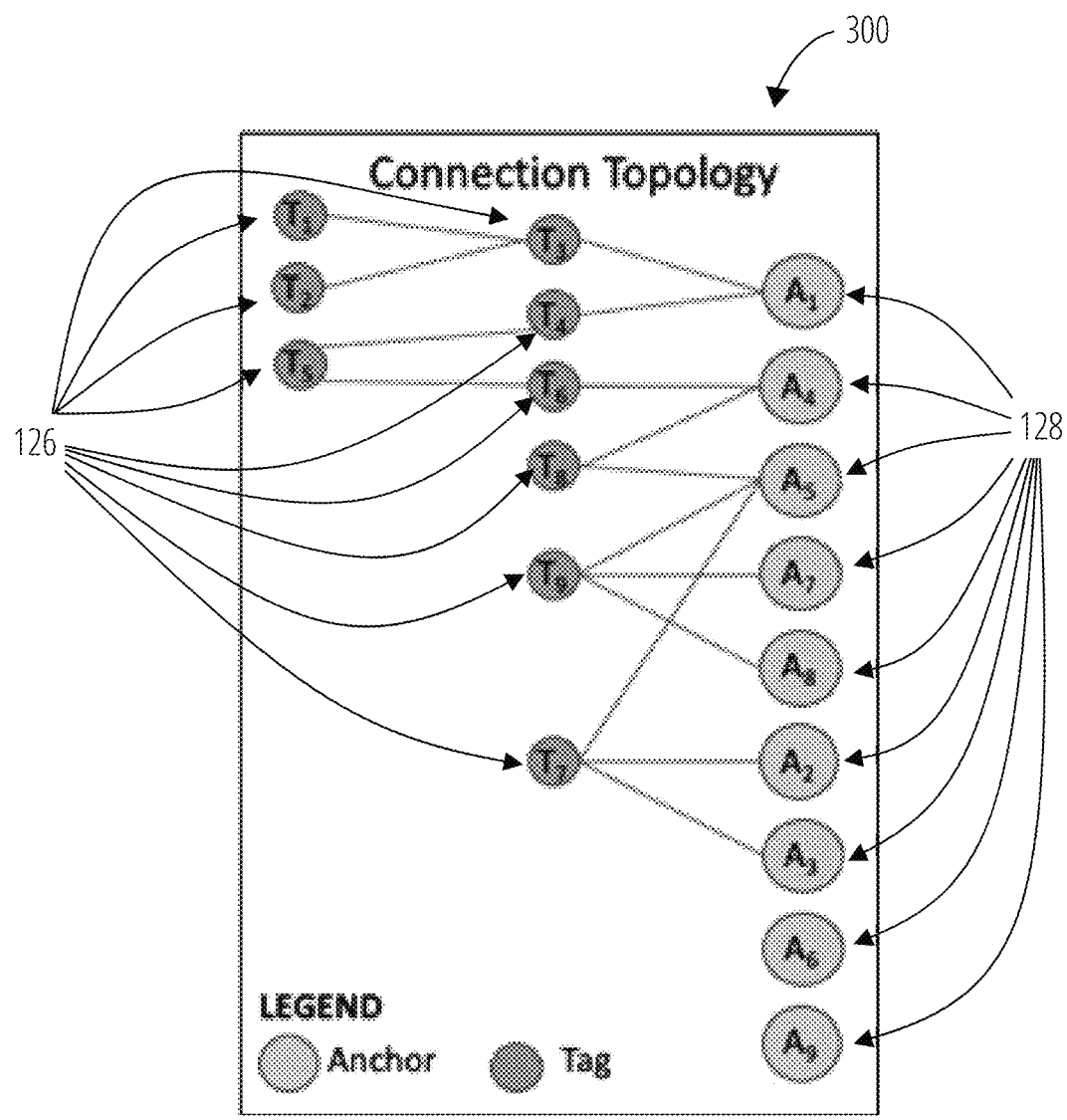
FIG. 3 illustrates a schematic diagram of a connection topology of an exemplary wireless network, in accordance with one embodiment.

In some embodiments, topology entity 106 comprises in its memory 122 a view or knowledge of the connection/communication links between individual devices of the network 104, referred herein as the connection topology 108 of the network. As an example only, FIG. 3 shows a connection topology 300 of an exemplary network containing both anchors and tags: 9 anchor 128 (A1 to A9) and 9 tags 126 (T1 to T9), the lines between devices indicating a connection/communication link therebetween.

In some embodiments, the topology entity 106 may be aware of the network's connection topology 108 before any positioning/ranging event is initiated and use that information to aid that positioning. In some embodiments, the connection topology 108 could have been determined through various mechanisms, e.g., by determining which devices are able to hear which other devices throughout the network 104 and this information being funneled to the topology entity 106, who can then build the connection topology 108.

It is typical in a wireless network that the connection topology 108 of devices is related to the spatial topology, i.e., where the devices are with respect to one another in the physical world, as would be depicted on a map or floorplan. This means that devices that have a direct connection/communication link to one another are often also closer to one another than devices without such a link. The reason is that wireless signals attenuate (weaken) as they travel has the signal power density is proportional to the inverse square of the distance. This statement is not absolutely exact, as other factors influence whether devices can wirelessly communicate. But the effect is sufficiently prevalent to assume that the connection topology has some similarity to the spatial topology.

Figure 4:
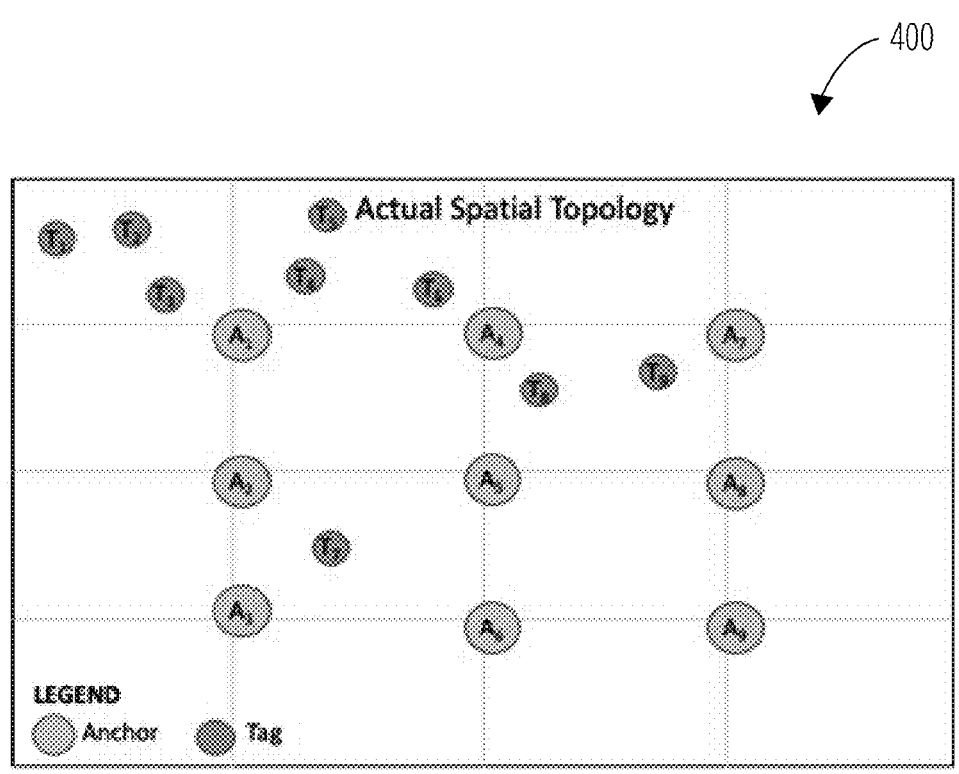
FIG. 4 illustrates a schematic diagram of a spatial topology of the exemplary wireless network of FIG. 3, in accordance with one embodiment.
Figure 5:
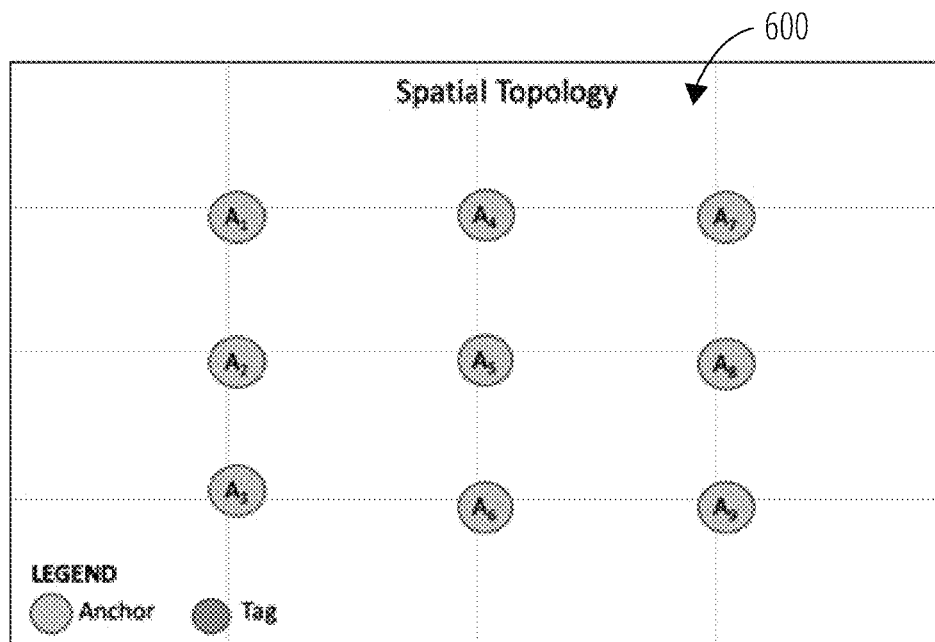
FIG. 5 illustrates a schematic diagram of a first iteration of a spatial topology of the exemplary network of FIG. 3 as constructed by the topology entity of FIG. 1, in accordance with one embodiment.

To better illustrate the discussion below, FIG. 4 shows a spatial topology 400 of the exemplary network of FIG. 3, which is initially unknown to the topology entity 106. Using the relation between the connection topology 108 and the spatial topology, and in accordance with one exemplary embodiment, the topology entity 106 can now proceed to build a low-accuracy spatial topology 110 of the location of the tags, in the following way:

Upon installation of the anchors A1-A9, the fixed physical location of each anchor is encoded in the internal memory of the topology entity 106 and this information remains unchanged unless one or more anchors are moved. The tags (T1-T9), with to-be-determined positions, may be moving, but for the sake of the explanation only may be considered nearly stationary, at least for the short time period during which positioning occurs. So, after this step, a first iteration 600 of the low-accuracy spatial topology 110 contains only the anchors A1-A9 as illustrated in FIG. 5.

Continuing, each device on the network 104 has the ability to report to the topology entity 106 a list of neighbouring devices (e.g., which other devices are within radio range, either exhaustively or else at least a subset of the devices in range).

Figure 6:
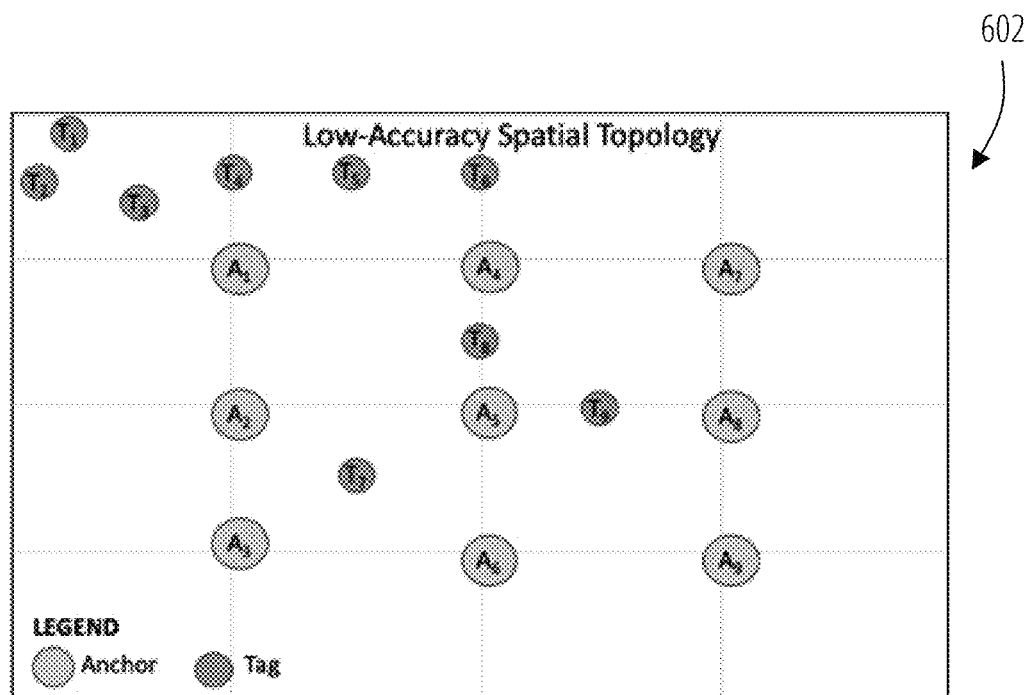
FIG. 6 illustrates a schematic diagram of a final iteration 600 of the spatial topology of the exemplary network of FIG. 3 as constructed by the topology entity of FIG. 1, in accordance with one embodiment.

Using these lists of neighbouring devices, the topology entity 106 can make an informed estimate about where the Tags T1-T9 are likely to be on the map (i.e., the low-accuracy spatial topology 110). Such a low-accuracy spatial topology does not need to be highly accurate. A non-limiting example of how the topology entity 106 may build this low-accuracy spatial topology 110 is presented below, in accordance with one embodiment:

1. T3 can only see A1 and not A2, A6 or any other anchors in the connection topology 300. It can thus be inferred that T1 is likely on the opposite side from A1 of where A1's closest neighbor anchors are, being A2 and A6. Hence the topology entity 106 will add them to the low-accuracy map to the North-West of A1, assuming the top edge of the map points North.
2. T1 and T2 cannot see any anchor but they can see T3. As a result, they are positioned even further away from the anchors, but close to T3.
3. T7 can see A2, A3 and A5, hence the topology entity 106 will add them to the low-accuracy map in between these three anchors.
4. A similar logic will estimate the spatial positions of the other tags to arrive are the final iteration 602 of the low-Accuracy spatial topology 110 as depicted in FIG. 6. It can be observed that the map 602 of FIG. 6 indeed resembles the actual spatial topology 400 of FIG. 4.

In some embodiment, the topology entity 106 can increase the accuracy of the tag positions on the low-accuracy spatial topology 110 for example by taking into consideration the actual signal strengths reported by the tag when the tag was discovering nearby anchors.

In some embodiments, when a tag's accurate position is at a certain moment determined through the actual positioning activity, it's high-accuracy position can be added to the low-accuracy spatial topology 110 in the same way an anchor is, i.e., with an assumed known position and thus aid in estimating the low-accuracy position of other tags.

Once this low-accuracy spatial topology 110 has been built by using the topology information, the Topology entity 106 can use it in informing how to proceed with the selection of the participating anchors for the actual (high-accuracy) positioning of a participating tag, by selecting from the low-accuracy spatial topology 110 the anchors to which the participating tag is likely to be close by and which are hence well suited to perform ranging to the tag.

In some embodiments, the selected participating anchors need not be directly connected to the participating tag in the connection topology 108, because the ranging technology may have a longer wireless range than the wireless communication technology used to establish the connection topology 108, thereby allowing to incorporate more anchors in the positioning than the connections in the low-accuracy map may suggest.

In some embodiments, the topology entity 106 may further be fed with information from the physical world, such as the location of walls and other structures. This can further aid the accuracy of positioning by selecting the best anchors to position with respect thereto. For example, if from the physical-world information the topology entity knows that there are objects between the low-accuracy position of the tag and the anchor, then it can be expected that the ranging between that anchor and the tag will be less accurate. As a result, the topology entity 106 may favor participating anchors for ranging to that participating tag to gain positioning accuracy.

The use of the topology entity 106 as described above in accordance with different embodiments has multiple benefits, including for example:
1. Discovery between tags and anchors is eliminated thereby reducing power consumption and allowing for a larger density of devices to co-exist in the same network.
2. Only the most suitable devices must participate in the positioning, resulting in lower network traffic. As a result, the system can support a larger density of network devices and/or a higher positioning update rate.
3. The method allows adding information from the physical world, such as walls, structures, heights of objects, etc., to be taken into account by the positioning algorithm and thus lead to higher positioning accuracy.

Priority Ranging

In some embodiments, the network topology information may further be used to determine the order in which the positioning of tags is initiated. This may be, in some embodiments, combined or integrated with the systems and methods described above.

For example, in some embodiments, the order in which the tags are positioned may be determined by taking into account the accuracy of each tag's position in the connection topology and/or in the low-accuracy spatial topology.

One exemplary method to do this is by letting the topology entity 106 establish an accuracy score for each anchor 128. In one embodiment, this may be done by utilizing number of links to traverse between the tag and the anchor(s).

Taking the same exemplary connection topology as in FIG. 3 again as an example. The topology entity will first attempt to range to T3 before ranging to T1. The logic behind this is that since T3 is connected to a known fixed position anchor (A1), then the low-accuracy position of T3 is more accurate than that of T1.

This allows, for example, to achieve a higher positioning accuracy and lower network traffic because only the most suitable anchors have to participate in the positioning. As a result, the system can support a larger density of network devices and/or a higher positioning update rate. In addition, the method discussed above allows to limit the anchors participating to a positioning activity to those with a high likelihood of having an Anchor-Tag distance between which a reliable ranging can be carried out. This avoids that ranging events are attempted that do not lead to successful ranging. This in turn avoid unnecessarily depleting device batteries of device outside of reliable ranging distance to the tag.

Detecting Stationary States

In some embodiments, the topology entity 106 may further take into account motion information from the tags to determine when a positioning action should take place. Detecting correctly when a tag has reached a stationary state is an important feature in positioning applications. Indeed, when in a stationary state, it is of little use to carry out power-consuming positioning/ranging actions because the position of the tag has not changed since the last time positioning was carried out. Only when the tag is in motion, is it worthwhile consuming power for ranging to get a position update. If a Tag's stationary state is not or incorrectly used to drive positioning actions, then this will result in:
- Extra power consumption for both the Tag and the Anchor.
- High positioning latencies if the stationary state is detected too late.

Typically, a tag's stationary state might be detected by having a simple motion-triggered timer, for example the tag detects motion through any type of motion-sensor, such as an accelerometer, a PIR sensor or any other type of suitable mechanism. That motion then triggers a timer implemented in the tag. When the timer expires the tag is assumed to be stationary. As long as motion occurs the timer is reset such that it only expires after the motion stops and thus it is stationary. However, it may be difficult to determine the magnitude of the motion and hence whether a re-positioning is required or if the previous position can still be assumed to be sufficiently accurate.

Thus, in some embodiments, the topology entity 106 of system 100 may aid in determining when a positioning action should take place.

In one exemplary embodiment, the method works in the following way:

When a tag detects motion, for example by means mentioned above, it informs the topology entity 106 that it is moving. The tag at this point starts to update its neighbor device information on a regular basis and informs the topology entity of its new neighbors. In the special case the wireless communication network is a mesh network, such regular neighbor discovery is usually already required by default for the mesh network for other purposes, thus not causing any extra overhead. Also, in other types of wireless networks, neighbor discovery can be done without a heavy power penalty.

Then, the topology entity 106 updates the low-accuracy spatial topology 110 with the new information from the tag, thereby re-estimating the low-accuracy position of the tag as discussed above.

If the Topology entity 106 then believes the tag has changed its position enough to warrant a position update (e.g., when is has likely changed from one zone to another zone, or based on a pre-defined threshold), the Topology entity 106 instructs the tag and/or the relevant anchors to run a positioning action.

However, if the Tag is still moving or within the same estimated position as before, the Topology entity 106 might defer the ranging to save power of the anchors and tag. One example of this is if the tag is on a conveyor or within a packaging area where it is expected to be moving constantly but still staying within a zone.

Such a method has the benefit of having a lower power consumption at the tag level because positioning only (re-) occurs when a substantial change in position has been observed; and the additional benefit of a lower network traffic because fewer useless repositioning activities required, hence supporting a denser network of tags.

Interchanging Tag and Anchor Roles

Figure 7:
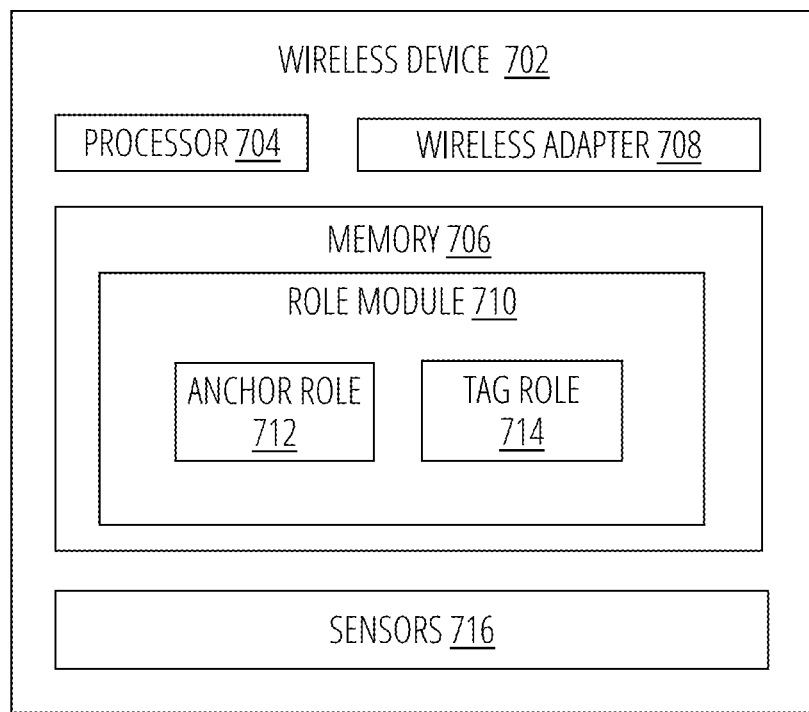
FIG. 7 illustrates a schematic diagram of a wireless device which may be changeably configured to take the role of a tag and/or an anchor, in accordance with one embodiment.

In some embodiments, the tags and anchors maybe configured so that a tag may change its role into an anchor and vice-versa. For example, in some embodiments and as illustrated in FIG. 7, at least one of the tags 126 and anchors 128 discussed above may take the form of a wireless device 702 comprising a processor 704 communicatively linked to a wireless adapter 708 and a memory 706, and which may be changeably configured to be operable as a tag 126 and/or an anchor 128.

In some embodiments, this may be done via a role module 710 implemented in software and/or hardware located on the memory 706 of device 702, the role module 710 comprising instructions that allow the device 702 to perform an anchor role 712 and/or a tag role 714. In some embodiments, the role module 710 may be operable to switch between the anchor role 712 and tag role 714, or vice-versa, and/or it may also allow the wireless device 702 to perform both roles simultaneously.

In addition, in some embodiments, the wireless device 702 may further comprise one or more sensors 716 communicatively linked to the processor 704, for example motion sensors, temperature sensors, or any other type of sensors known in the art.

In some embodiments, the switch between the anchor role 712 and the tag role 714 maybe done based on any type of trigger, either externally generated outside of the wireless device 702, or generated from within the wireless device 702. In some embodiments, the triggers may be based on pre-defined conditions, user input, sensor input (for example from sensors 716), detected network changes, including a change in the detected neighbouring devices of wireless device 702. In some embodiments, the role assignment for the wireless device 702 and any change thereto may be based, for example, on instructions received from the topology entity 106. This requirement is ideal in hybrid networks using both position and distance-based features.

As an example only, assume such a device is affixed to a truck/trailer or the like. When the truck approaches a loading bay, the wireless device 702 on the truck assumes the role of a tag and leads to a position with the on-site anchors. This way the system establishes a position for the vehicle. Next when the truck is being loaded with tagged assets, the wireless device 702 on the vehicle assumes the role of an anchor to be used by the tags being loaded onto the truck to determine accurately when a tagged asset gets loaded.

In another example, the wireless device 702 may be attached to a movable machine such as a medical scanner in a hospital. The device can be configured to assume the role of a tag to estimate the position of the machine, but it can also be simultaneously configured to assume the role of an anchor to determine when a person carrying a tag comes close to the machine.

In some embodiments, the wireless adapter 708 is configured to be communicatively coupled to network 104 via a plurality of wireless communication protocols/systems known in the art. This may include, for example, and without limitation: Bluetooth/BLE (Bluetooth Low Energy), WIFI, Ultra-Wide-Band (UWB), cellular or the like.

The methods described herein may be implemented in software, hardware, or a combination thereof, in different embodiments. In addition, the order of methods may be changed, and various elements may be added, reordered, combined, omitted, or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Finally, structures and functionality presented as discrete components in the example configurations may be implemented as a combined structure or component. These and other variations, modifications, additions, and improvements may fall within the scope of embodiments as described.

While the foregoing is directed to embodiments of the present invention, other and further embodiments of the invention may be devised without departing from the basic scope thereof.

What is claimed is:

1. A computer-implemented method for positioning a designated asset from a plurality of assets, the method comprising:

building, at a topology entity communicatively coupled to a wireless network, the wireless network comprising a plurality of tags positionally associated with the plurality of assets and a plurality of anchors having a fixed physical location, a low-accuracy spatial topology of said wireless network;

selecting, at the topology entity and at least in part using said low-accuracy spatial topology, a list of a plurality of participating anchors for participating in a plurality of ranging events with a participating tag positionally associated with the designated asset;

sending, from the topology entity, to the participating tag and to each of the participating anchors, an indication that a plurality of ranging events is to be executed therebetween;

executing, between the participating tag and each of the participating anchors, a ranging event of said plurality of ranging events;

computing, at a positioning engine communicatively coupled to the wireless network, a position of the participating tag and the designated asset based on a ranging information generated by the plurality of ranging events; and wherein the list of the plurality of participating anchors is an ordered list characterizing the order upon which the plurality of ranging events between participating anchor and each of the participating tags is to be executed, the order being based on an accuracy score of said participating tag, computed by the topology entity, a higher accuracy score being associated with a higher priority;

wherein the accuracy score is based, at least in part, on a number of links between the participating tag and each of the plurality of participating anchors, a lower number of links being associated with a higher accuracy score; and wherein each ranging event from the plurality of ranging events is initiated in accordance with that ordered list.

2. The computer-implemented method of claim 1, wherein said building is done by:
- encoding, at the topology entity, the fixed physical location of each of said plurality of anchors to the low-accuracy spatial topology;
- identifying, at each of said plurality of tags and at each of said plurality of anchors, a set of in-range tags and anchors from remaining plurality of tags and plurality of anchors;
- reporting, from each of said plurality of tags and each of said plurality of anchors, to the topology entity, the set of in-range tags and anchors; and
- inferring, at the topology entity, from said fixed physical location of said plurality of anchors and from the set of in-range tags and anchors, the low-accuracy topology map of the location of the plurality of tags and the plurality of anchors.

3. The computer-implemented method of claim 2, wherein said selecting is done by, at the topology entity:
- determining, using the low-accuracy topology map, the plurality of participating anchors as being one or more anchors from the plurality of anchors which are the closest to the participating tag.

4. The computer-implemented method of claim 2, wherein said determining further includes: recording, at each of said plurality of anchors and at each of said plurality of tags, a signal strength measurement corresponding to each device in said set of in-range tags and anchors; and
- wherein said inferring is also based on, at least in part, said signal strength measurement.

5. The computer-implemented method of claim 1, wherein the topology entity is implemented on one of said plurality of anchors.

6. The computer-implemented method of claim 3, wherein said topology entity comprises in a memory thereof a map of physical obstacles and their physical position, and wherein said determining is based, at least in part, on said the physical position of the physical obstacles.

7. The computer-implemented method of claim 1, further comprising the steps of, between said building and said selecting:
- detecting, at each tag in the plurality of tags, via a motion sensor, a motion of said tag;
- identifying, at each tag, at regular time intervals, any in-range tags and anchors from said plurality of tags and said plurality of anchors;
- sending, from the tag, to the topology entity a list of said identified in-range tags and anchors and an indication that the tag is detecting motion;
- receiving, at the topology entity, the list of said identified in-range tags and anchors for said tag and the indication that the tag is detecting motion; and
- updating the low-accuracy spatial topology based on said list of identified in-range tags and anchors.

8. A system for positioning a designated asset in a plurality of assets over a wireless network, the system comprising:
- a plurality of tags communicatively coupled to the wireless network, each tag of said plurality of tags being correspondingly positionally associated with the plurality of assets;
- a plurality of anchors communicatively coupled to the wireless network and each having a fixed physical location;
- a topology entity, the scheduling entity comprising:
  - a memory;
  - a network interface communicatively coupled to said wireless network; and
  - a processor communicatively coupled to said memory and said network interface; and
  - wherein said topology entity is operable to:
  - build a low-accuracy spatial topology of said wireless network;
  - select, at least in part using said low-accuracy spatial topology, a list of a plurality of participating anchors for participating in a plurality of ranging events with a participating tag positionally associated with the designated asset;
  - send to the participating tag and to each of the participating anchors, an indication that a plurality of ranging events is to be executed therebetween; and
  - wherein said participating tag and each of the participating anchors are configured to:
  - execute, between the participating tag and each participating anchor, the ranging event to produce a corresponding ranging information;
  - the system further comprising a positioning engine communicatively coupled to the network, said positioning engine configured to calculate from each corresponding ranging information, a position of said participating tag and said designated asset; and
  - wherein the list of the participating anchors is an ordered list characterizing the order upon which the plurality of ranging events between participating anchor and each of the participating tags is to be executed, the order being based on an accuracy score of said participating tag, computed by the topology entity, a higher accuracy score being associated with a higher priority;
  - wherein the accuracy score is based, at least in part, on a number of links between the participating tag and each of the plurality of participating anchors, a lower number of links being associated with a higher accuracy score; and
  - wherein each ranging event from the plurality of ranging events is initiated in accordance with that ordered list.

9. The system of claim 8, wherein said topology entity is configured to build the low-accuracy spatial topology by:
- encoding the fixed physical location of each of said plurality of anchors to the low-accuracy spatial topology;
- wherein each of said plurality of tags and at each of said plurality of anchors are further configured to identify and report to the topology entity a set of in-range tags and anchors from remaining plurality of tags and plurality of anchors; and
- the topology entity being further configured to infer, from said fixed physical location of said plurality of anchors and from the set of in-range tags and anchors, the low-accuracy topology map of the location of the plurality of tags and the plurality of anchors.

10. The system of claim 8, wherein said selecting is done by, at the topology entity:
- determining, using the low-accuracy topology map, the plurality of participating anchors as being one or more anchors from the plurality of anchors which are the closest to the participating tag.

11. The system of claim 10, wherein said topology entity comprises in said memory thereof a map of physical obstacles and their physical position, and wherein said determining is based, at least in part, on said the physical position of the physical obstacles.

12. The system of claim 8, wherein at least one device of said plurality of tags and said plurality of anchors is changeably configurable to act as either a tag or as an anchor upon receiving a trigger.

13. The system of claim 12, wherein the trigger is received by the at least one device via the wireless network.

14. A non-transitory computer-readable storage medium, the computer-readable storage medium including instructions that when executed by a processor communicatively coupled to a wireless network comprising a plurality of anchors, each anchor having corresponding fixed physical location, and a plurality of tags, each tag being positionally associated with a corresponding asset, causes the processor to:
- build, at a topology entity communicatively coupled to the wireless network, a low-accuracy spatial topology of said wireless network;
- select, at the topology entity and at least in part using said low-accuracy spatial topology, a list of a plurality of participating anchors for participating in a plurality of ranging events with a participating tag positionally associated with the designated asset;
- send, from the topology entity, to the participating tag and to each of the participating anchors, an indication that a plurality of ranging events is to be executed therebetween;
- execute, between the participating tag and each of the participating anchors, a ranging event of said plurality of ranging events;
- compute a position of the participating tag and the designated asset based on a ranging information generated by the plurality of ranging events; and
- wherein the list of the plurality of participating anchors is an ordered list characterizing the order upon which the plurality of ranging events between participating anchor and each of the participating tags is to be executed, the order being based on an accuracy score of said participating tag, computed by the topology entity, a higher accuracy score being associated with a higher priority;
- wherein the accuracy score is based, at least in part, on a number of links between the participating tag and each of the plurality of participating anchors, a lower number of links being associated with a higher accuracy score; and
- wherein each ranging event from the plurality of ranging events is initiated in accordance with that ordered list.

15. The non-transitory computer-readable storage medium of claim 14, wherein said building is done by:
- encoding the fixed physical location of each of said plurality of anchors to the low-accuracy spatial topology;
- receiving, from each of said plurality of tags and each of said plurality of anchors, a set of in-range tags and anchors;
- inferring from said fixed physical location of said plurality of anchors and from the set of in-range tags and anchors, the low-accuracy topology map of the location of the plurality of tags and the plurality of anchors.

16. The non-transitory computer-readable storage medium of claim 15, wherein said selecting is done by, at the topology entity:
- determining, using the low-accuracy topology map, the plurality of participating anchors as being one or more anchors from the plurality of anchors which are the closest to the participating tag.

17. The non-transitory computer-readable storage medium of claim 16, wherein said determining further includes:
- receiving, from each of said plurality of anchors and from each of said plurality of tags, a signal strength measurement corresponding to each device of said set of in-range tags and anchors;
- wherein said inferring is also based on, at least in part, said signal strength measurement.

18. The non-transitory computer-readable storage medium of claim 16, wherein said determining is based, at least in part, on a known physical position of a plurality of physical obstacles.

* * * * *